(12) United States Patent
Foina et al.

(10) Patent No.: US 10,713,959 B2
(45) Date of Patent: *Jul. 14, 2020

(54) LOW ALTITUDE AIRCRAFT IDENTIFICATION SYSTEM

(71) Applicant: Airspace Systems, Inc., San Leandro, CA (US)

(72) Inventors: Aislan Gomide Foina, El Cerrito, CA (US); Guy Bar-Nahum, Sausalito, CA (US); Jasminder Singh Banga, San Francisco, CA (US)

(73) Assignee: Airspace Systems, Inc., San Leandro, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,406

(22) Filed: Dec. 10, 2018

(65) Prior Publication Data

US 2019/0108762 A1 Apr. 11, 2019

Related U.S. Application Data

(63) Continuation of application No. 15/839,661, filed on Dec. 12, 2017, now Pat. No. 10,192,451, which is a
(Continued)

(51) Int. Cl.
*G06F 17/00* (2019.01)
*G08G 5/00* (2006.01)
*B64C 39/02* (2006.01)

(52) U.S. Cl.
CPC ......... *G08G 5/0082* (2013.01); *B64C 39/024* (2013.01); *G08G 5/0026* (2013.01); *G08G 5/0069* (2013.01); *B64C 2201/146* (2013.01)

(58) Field of Classification Search
CPC .. G08G 5/0082; G08G 5/0026; G08G 5/0069; B64C 39/024; B64C 2201/146
(Continued)

(56) References Cited

U.S. PATENT DOCUMENTS 6,173,220 B1 * 1/2001 Schmitt ................. G01C 23/00
340/945
7,724,155 B1 * 5/2010 Anderson .............. G01C 23/00
340/945
(Continued)

FOREIGN PATENT DOCUMENTS

CA        2957886       10/2017
CN      103049764 A      4/2013
(Continued)

OTHER PUBLICATIONS

International Search Report and Written Opinion for PCT/US2016/037071 dated Sep. 2, 2016, 8 pgs.
(Continued)

*Primary Examiner* — Shardul D Patel
(74) *Attorney, Agent, or Firm* — Van Pelt, Yi & James LLP

(57) ABSTRACT

Example implementations associated with the aspects of the present invention include a low altitude aircraft identification system composed by three components: a small aircraft electronic identification box with an embedded logger, a ground identification equipment to automatically identify the aircraft just pointing at it, and an identification code database. The identification code can be transmitted by a visible light color sequence or by a radio frequency signal. The ground identification device is capable of recognizing both kinds of code.

21 Claims, 14 Drawing Sheets

Related U.S. Application Data continuation of application No. PCT/US2016/037071, filed on Jun. 10, 2016.

(60) Provisional application No. 62/175,153, filed on Jun. 12, 2015, provisional application No. 62/566,450, filed on Oct. 1, 2017.

(58) Field of Classification Search
USPC .............. 701/4, 26; 342/357.1, 357.07, 464; 700/276; 244/63
See application file for complete search history.

(56) References Cited

U.S. PATENT DOCUMENTS

| | | | |
|---|---|---|---|
| 9,646,502 | B1 | 5/2017 | Gentry |
| 2011/0299732 | A1 | 12/2011 | Jonchery |
| 2014/0129056 | A1 | 5/2014 | Criado |
| 2014/0277854 | A1* | 9/2014 | Jones ............... G05D 1/102 701/3 |
| 2014/0320667 | A1* | 10/2014 | Densham ........... H04N 5/247 348/169 |
| 2015/0054639 | A1* | 2/2015 | Rosen ............ G06K 9/00785 340/439 |
| 2016/0239803 | A1 | 8/2016 | Borley |
| 2016/0274578 | A1 | 9/2016 | Arwine |
| 2016/0352524 | A1 | 12/2016 | Kinney |
| 2017/0024746 | A1 | 1/2017 | Henry |
| 2017/0127459 | A1 | 5/2017 | Ye |
| 2017/0195945 | A1 | 7/2017 | Solomon |
| 2018/0313945 | A1 | 11/2018 | Parker |

FOREIGN PATENT DOCUMENTS

| | | |
|---|---|---|
| CN | 105739520 A | 7/2016 |
| KR | 1020110078823 A | 7/2011 |
| KR | 1020170014817 A | 2/2017 |
| KR | 1020170028811 A | 3/2017 |
| KR | 101728641 B1 | 4/2017 |
| WO | 20160154948 | 10/2016 |

OTHER PUBLICATIONS

Singh et al., Adi-Ford Motor Company, "A Zero-Cost Solution for Remote Identification of In-flight SUAS Under VFR Conditions", Mar. 7, 2018, available at https://media.ford.com/content/dam/fordmedia/NorthAmerica/US/2018/03/07/Ford-A-Zero-Cost-Solution-for-Remote-Identification.pdf (accessed Apr. 23, 2018) 11 pages.

Singh, Adi-Ford Motor Company, "A Zero-Cost Solution for Remote Identification of In-flight sUAS Under VFR Conditions", 2 pages Pre-Publication Version.

* cited by examiner

LOW ALTITUDE AIRCRAFT IDENTIFICATION SYSTEM

CROSS REFERENCE TO RELATED APPLICATIONS

This application is a continuation of U.S. patent application Ser. No. 15/839,661 entitled LOW ALTITUDE AIRCRAFT IDENTIFICATION SYSTEM, filed on Dec. 12, 2017, which is a continuation of PCT/US2016/037071 entitled A LOW ALTITUDE AIRCRAFT IDENTIFICATION SYSTEM, filed on Jun. 10, 2016, which claims priority to U.S. Provisional Patent Application No. 62/175,153, entitled LOW ALTITUDE AIRCRAFT IDENTIFICATION SYSTEM, filed Jun. 12, 2015, all of which are incorporated herein by reference for all purposes. Further, U.S. patent application Ser. No. 15/839,661 claims priority to U.S. Provisional Patent Application No. 62/566,450, entitled ENCRYPTION FOR LOW ALTITUDE AIRCRAFT IDENTIFICATION SYSTEMS, filed Oct. 1, 2017, which is incorporated herein by reference for all purposes.

BACKGROUND

1. Technical Field

Aspects of the example implementations are directed to methods and systems for identification of airborne objects at a low altitude, and more specifically, to systems and methods for identification of low-altitude aircraft.

2. Related Art

Related art unmanned aerial vehicles (UAVs) or unmanned aircraft systems (UASs) markets once belonged to professional companies. However, related art UAVs and UASs now include amateur pilots flying affordable models available for purchase, for example, in an electronic store, and which may be controlled by mobile communication devices such as smartphones. However, these related art flying objects may cause damage and/or injury due to their altitude, speed and weight. Thus, there is a need to manage the related art UAVs and UASs.

In ground-based systems, such as the related art automotive market, one of the bases of the car control system, may include an identification credential issued by a division of motor vehicles (DMV) or others, such as a license plate. However, there is no analogous identification method or system for related art UAVs and/or UASs. For related art small UASs (e.g., aircrafts up to 25 pounds flying up to 500 ft of the low altitude airspace), related art tail numbers that are used in commercial aircraft are too large in size (e.g., area) to be provided on these vehicles, or they will be too small to allow the small UAS identification.

Encrypting information via a regular broadcast radio signal such as WiFi while utilizing a static SSID for the identification and addressing of WiFi packets is prone to "packet sniffing" to determine the SSID. Once the SSID is determined it may be possible to "clone" that device and intercept packets intended for it. It would be useful and more secure to have an encrypted identifier for any radio frequency (RF) transmission beacon, and particularly for WiFi transmissions, that utilized existing standards and equipment.

An identification solution is needed that permits ground-level identification, as well as identification by other aircrafts of various sizes and altitudes. The identification solution also needs to allow detection in an automated manner using a device.

SUMMARY

Example implementations associated with the aspects of the present invention include a low altitude aircraft identification system composed by three components: a small aircraft electronic identification box with an embedded logger, a ground identification equipment to automatically identify the aircraft just pointing at it, and a central identification code database server.

The identification code can be transmitted by a visible light color sequence or by a radio frequency signal. The ground identification device is capable of recognizing both kinds of code.

Electronic Identification Box

A traffic management system has the function of monitoring the traffic and the ability of notifying the responsible party in case of any non-compliance with a regulation. Therefore, an operation to identify the responsible party is to identify the vehicle. The ground traffic management system requires all vehicles to have a license plate for driving on public roads. This license plate allows the police and other drivers to identify the vehicle.

With respect to UAVs and UASs, there is a need to have a structure that permits identification, as with a traffic management system.

Instead of the related art approach of stamping letters and numbers in the aircraft, the present example implementation is directed to a light array that blinks a defined color pattern sequence for each aircraft. One potential advantage of this identification mechanism is the possibility for a person to visually identify an aircraft from a distance of about 500 feet, without the use of any special equipment. The color sequence, blinking speed and the meaning thereof can be defined by the pilot, the fleet control or even by a regulatory agency. The number of colors used and the number of blinks may define the quantity of codes possible.

Together with the light array, the electronic identification box has a position logger and a transponder. The position logger has a global positioning system (GPS) module to obtain the absolute position where the aircraft is flying by. The logger stores the flight path of each trip made by the aircraft. Together with the positioning information, the speed and heading may also be stored. Telemetry data provided by the aircraft sensors, such as inertial measurement unit (IMU) and power level, and application data provided by the autopilot or any embedded component are also stored. This information is the proof of the aircraft real flight data, and it may perform functions similar to a civil aviation "black box" in case of a crash. In addition, in case of an UAV doing an autonomous flight beyond line-of-sight, the data may show where the UAS flew by.

The transponder may transmit a code similar to the one generated (e.g., blinked) by the light arrays but through the RF frequency, allowing automatic identification by any RF receiver on land, or installed in other aircrafts. In addition to the code, the transponder may also transmit the last position, including but not limited to heading and speed, thus allowing the implementation of a collision avoidance system. The identification box has also an independent battery to allow the transmitter works even without the external power supply. Accordingly, in case of an aircraft crash, the transponder will continue to transmit the last know position so that the wrecked vehicle may be located or identified.

The identification box has a photo sensor configured to receive external signals. In case the photo sensor is excited with a high luminous beam in a specific wavelength and modulation, such as a laser beam, the identification box may change its operational behavior. The identification box can, for instance, change its light brightness, send commands to the autopilot, increase the data storage frequency, but is not limited thereto.

One of the preset configurations for the photo sensor stimulation is to modify flag data in the RF data sent by the transmitter, and/or the behavior of the blinking pattern. In some scenarios, more than one aircraft may be flying close to each other, in a way that a receiver on the ground is detecting all of the flying aircraft without knowing which UAV is transmitting each identification code. Therefore, it is just a matter of directing a specific wavelength and modulated light beam emitter to one of the aircrafts, and the aircraft will thus modify its behavior and its transmitted data, allowing the data-to-vehicle association. This feature creates a duplex communication, allowing the identification box to send broadcast data by its color light emitters, and receive directional data through the light sensor.

Commands can also be received and executed using the communication channel. Through a physical connection between the identification box and the UAV autopilot, the identification box can, for instance, receive way point change command through a modulated light beam and change the UAV destination coordinates.

Ground Identification Device

A police department may maintain law enforcement agents who are supervising the roads and highways in order to detect drivers disobeying traffic laws. Devices such as the radar allow police officers to detect the vehicle speed. Moreover, the license plate allows for identifying the vehicle owner and accessing the complete history of the vehicle. This kind of control allows for small remote controlled aircraft surveillance and regulation.

The example implementation includes a remote (e.g., ground) device to assist the aircraft identification. Since the electronic identification box relies on visual information, the ground device is equipped with a camera, lens and image processing algorithms to capture the color sequence. In addition, this device has an RF receiver capable of receiving the identification box RF signal to connect both information sources and to verify the authenticity. The device may also have a network connection through Wi-Fi or cellphone network to access the identification server.

The aircraft code and the position where the aircraft was detected at are submitted to the central identification server to identify its owner, the responsible pilot and the flight permission. Hence, if the remote (e.g., ground) user wants to check if one specific vehicle has the flight permission to fly in that area, that user directs the identification device in the vicinity of the aircraft. The identification device automatically handles the identification and crosschecks with the identification database. After the database server verifies the information, the device shows on the screen if the aircraft position and timestamp is according to its permitted flight plan. In one example implementation, the device screen shows a "valid" message. Otherwise, the user will see an "invalid" message. Clicking in the message is possible to see all the information database information associated with the aircraft.

DRAWINGS

DETAILED DESCRIPTION

The subject matter described herein is taught by way of example embodiments. Various details have been omitted for the sake of clarity and to avoid obscuring the subject matter. Examples shown below are directed to structures and functions for implementing and enabling control and enforcement of access of user data.

Described herein are example embodiments of systems, devices, and methods that enable identification of airborne objects at a low altitude, and more specifically, to systems and methods for identification of low-altitude aircraft.

"SSID" herein refers to "Service Set IDentifier, a unique identifier attached to the header of packets sent over a wireless local-area network (WLAN). The SSID acts as a password when a mobile device tries to connect to the basic service set (BSS) and is a standard feature of the IEEE 802.11 WLAN architecture.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Figure 1:
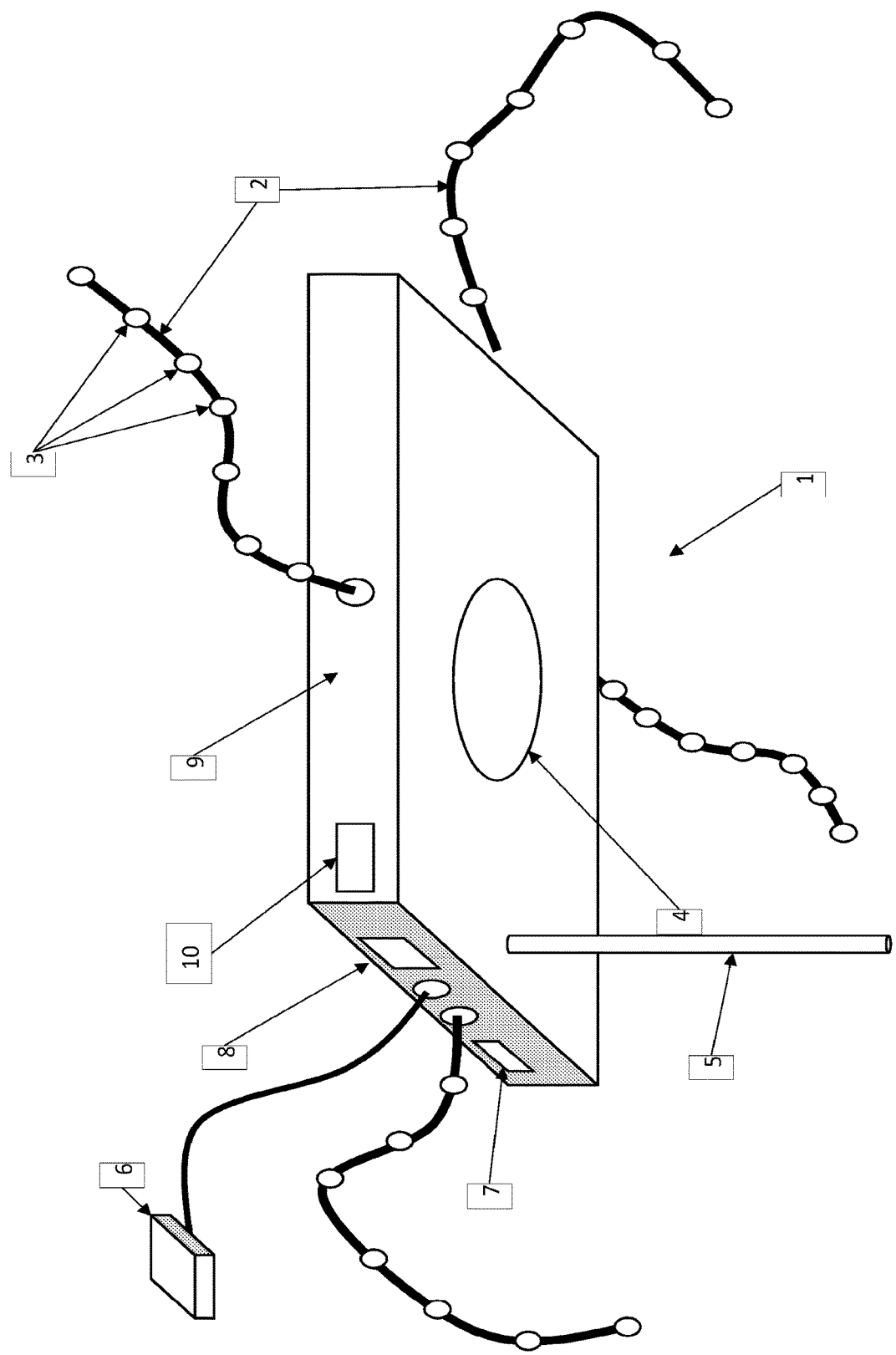
FIG. 1 shows the external view of the identification box with 4 light arrays, according to an example implementation.
Figure 2:
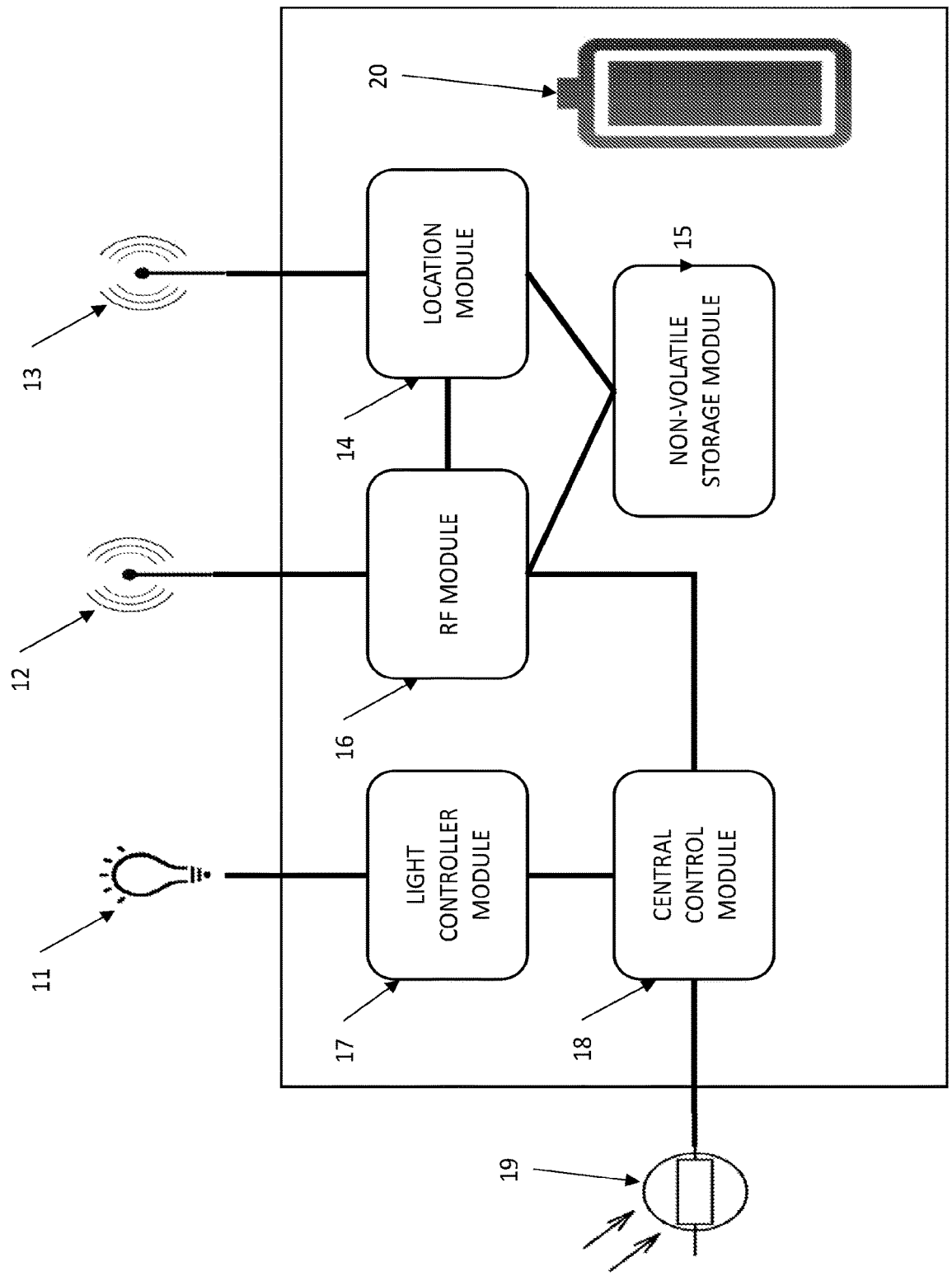
FIG. 2 shows the schematic view of the identification box, according to the example implementation.
Figure 7:
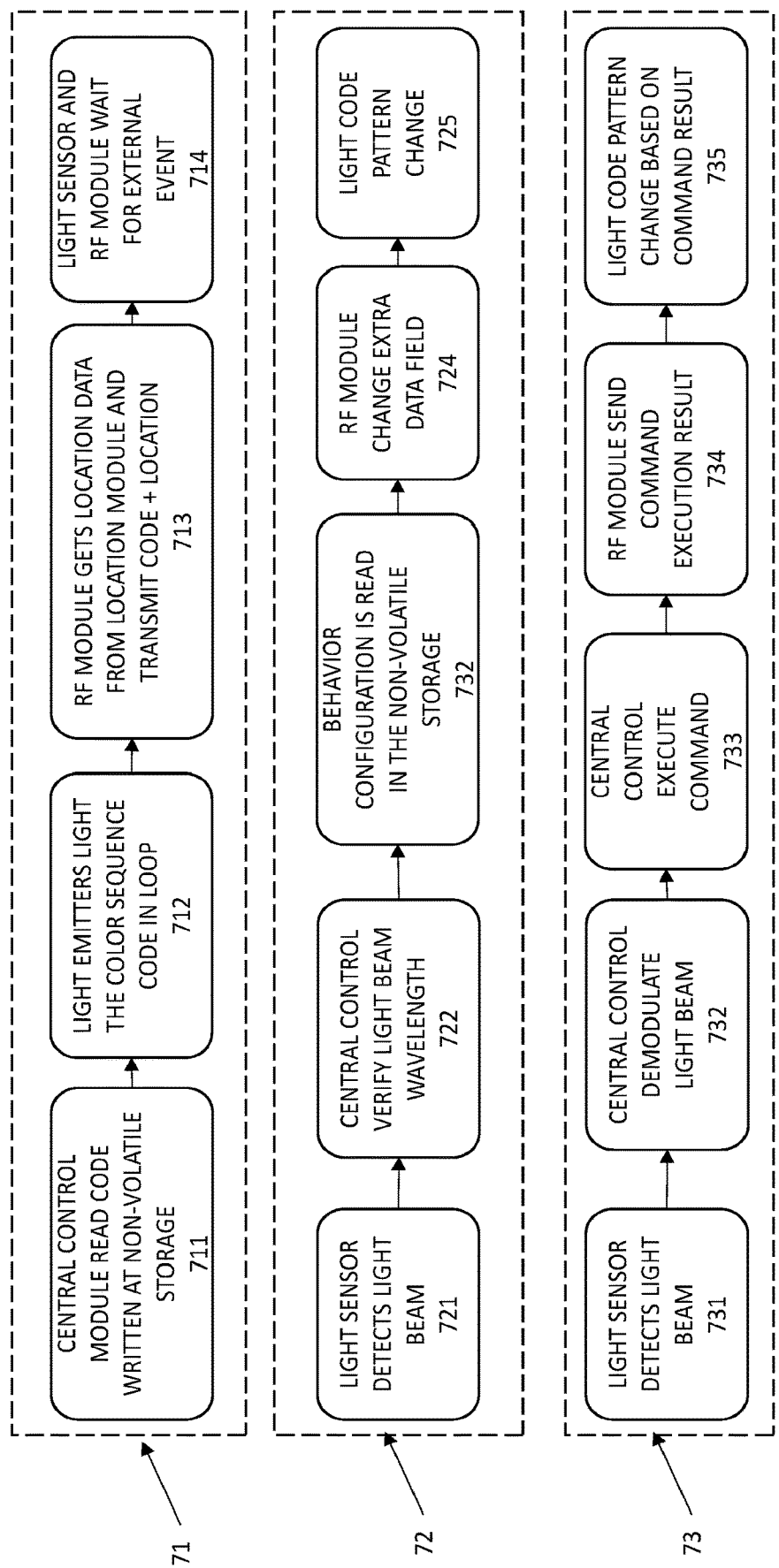
FIG. 7 shows the identification box software flow, according to the example implementation.

FIG. 1 shows the perspective view of one of the two components of the example implementation, FIG. 2 shows its schematic with the internal components, and FIG. 7 shows firmware execution flow.

As shown in FIG. 1, the identification box 1 includes one or more light arrays 2 each including several light color emitters 3. These color emitters 3 are controlled by the light controller module 17 as shown in FIG. 2 as being connected to color emitters 11. More specifically, the color emitters 3 generate (e.g., blink, variable light intensity or color fade) a defined color sequence programmed in the unit firmware executed by the central control unit 18 (shown in FIG. 2), and following the main loop flow 71, shown in FIG. 7 and described below.

The identification box 1 also has a radio antenna 5 connected to a RF module 16 shown in FIG. 2 as being connected to RF antenna 12, that transmits the same code or a modified version of the code through a radio signal. The RF module 16 can receive the RF signal from identification boxes (e.g. nearby) installed in other aircrafts, and save this information in the non-volatile storage module 15 that is connected to the memory card installed in the memory card slot 7.

The example implementation also has one light detection sensor 4 connected to a light receiver module 19 configured to detect external excitation by a light beam with defined wavelength and intensity. In case of external light detection by the light sensor 4, the light beam detection flow 72 of FIG. 7 is executed. Consequently, the behavior of the identification box 1 can change, for instance adding or changing extra data information to the transmitted RF signal or change the light blink pattern or intensity.

Additionally, the identification box 1 also has a location system antenna 6 (e.g., GPS antenna) connected to a location module 14, shown in FIG. 2 as being connected to system antenna 13, to log the flight path in the storage module 15. This positioning data (e.g. GPS data, camera motion capture, radio triangulation system) is also transmitted by the RF module 16 together with the identification code.

The identification box 1 has also an external power connector 8 used to recharge the internal power storage 20 (e.g., LiPo (Lithium-Polymer) battery or super capacitor) and supply power to all internal and external components.

In case of no power being supplied, the internal power storage 20 can supply power to all the components. In this "no external power" state, the RF module 16 may keep following the main loop flow 71, and transmitting the last location position and the identification code until the battery runs out of power, while the other components will be in a sleep mode.

All the internal components are protected by a housing 9 (e.g., standard weatherproof box) against impact and weather, in order to resist a crash without damaging the internal circuit.

Figures 3A, 3B:
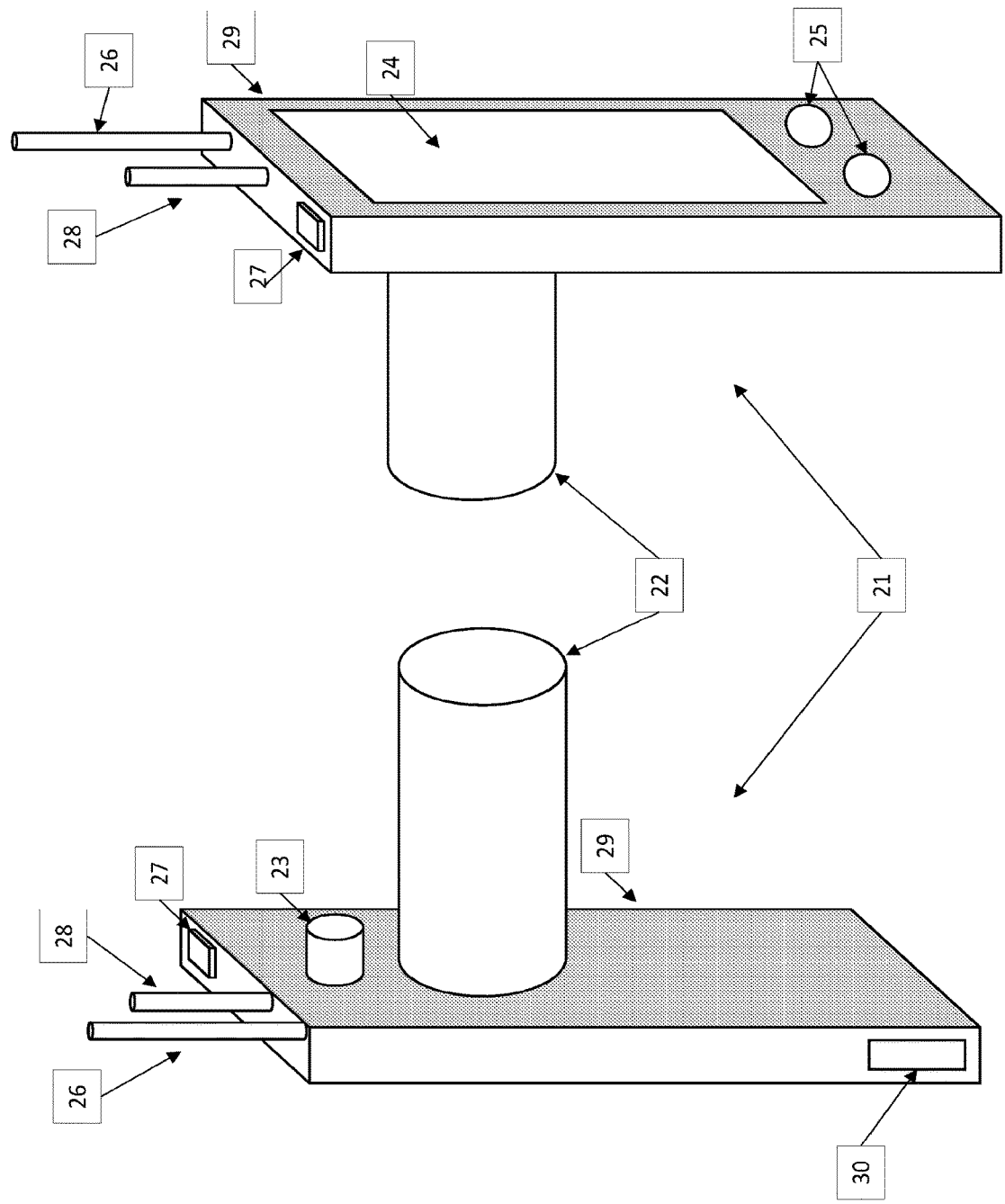
FIGS. 3A and 3B show the external view of the ground identification device facing forward and backward, according to the example implementation.
Figure 4:
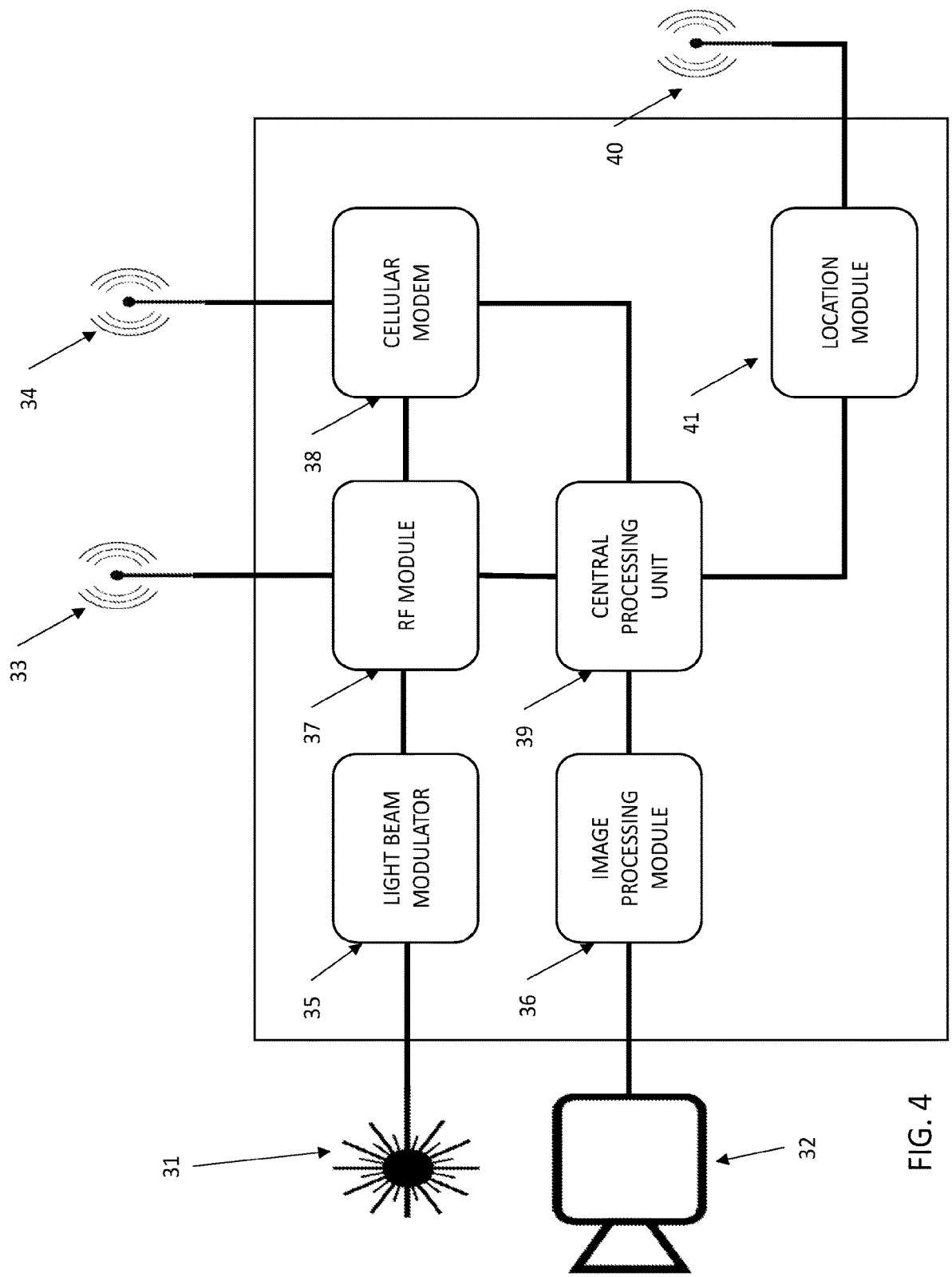
FIG. 4 shows the schematic view of the ground identification device, according to the example implementation.
Figure 5:
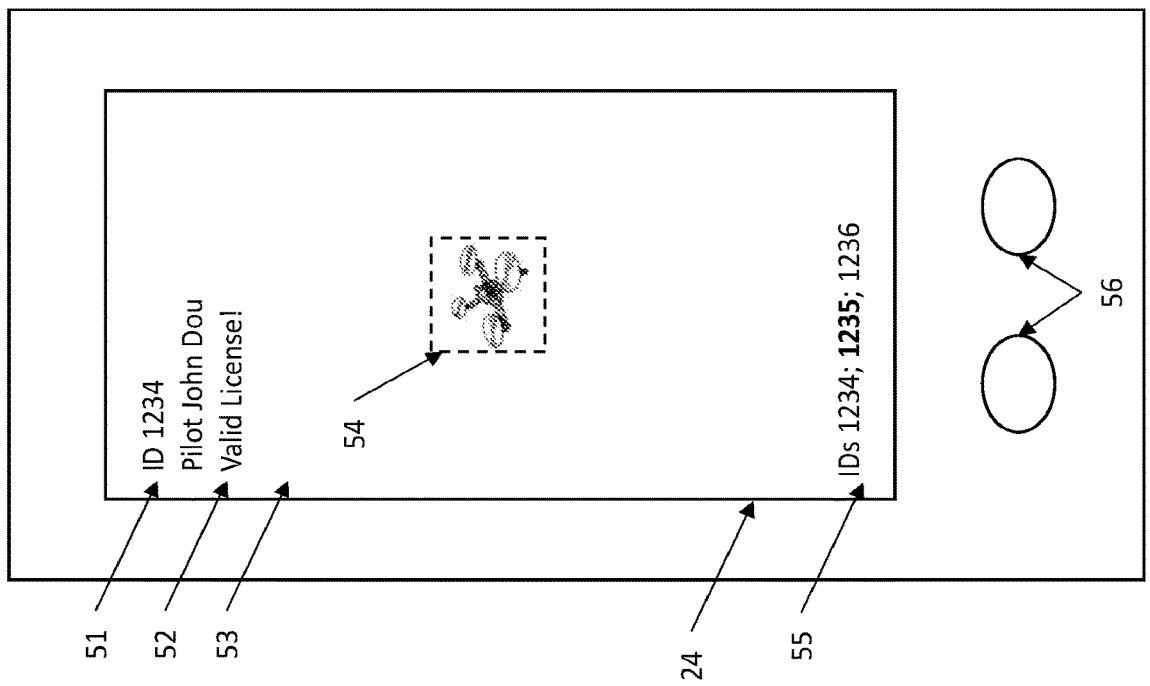
FIG. 5 shows the user interface of the ground identification device, according to the example implementation.

The other component of the example implementation is the ground identification device 21, which is remote from the UAV or UAS, as shown in left and right perspective in FIGS. 3A and 3B respectively, and with its internal schematic in FIG. 4. In addition, the main user interface is shown in FIG. 5, the server process in FIG. 6 and its firmware process flow in FIG. 8. The ground identification device 21 may be a custom-made device, specifically for the example implementation. Alternatively, the ground identification device 21 may be a mobile communication device (e.g., smartphone), containing instructions (e.g., software or downloadable and/or online application) as would be known to those skilled in the art. The mobile communication device can also be attached to external components like zoom lens or light beams, but not limited to, to be able to execute other features of the ground device 21.

Figure 8:
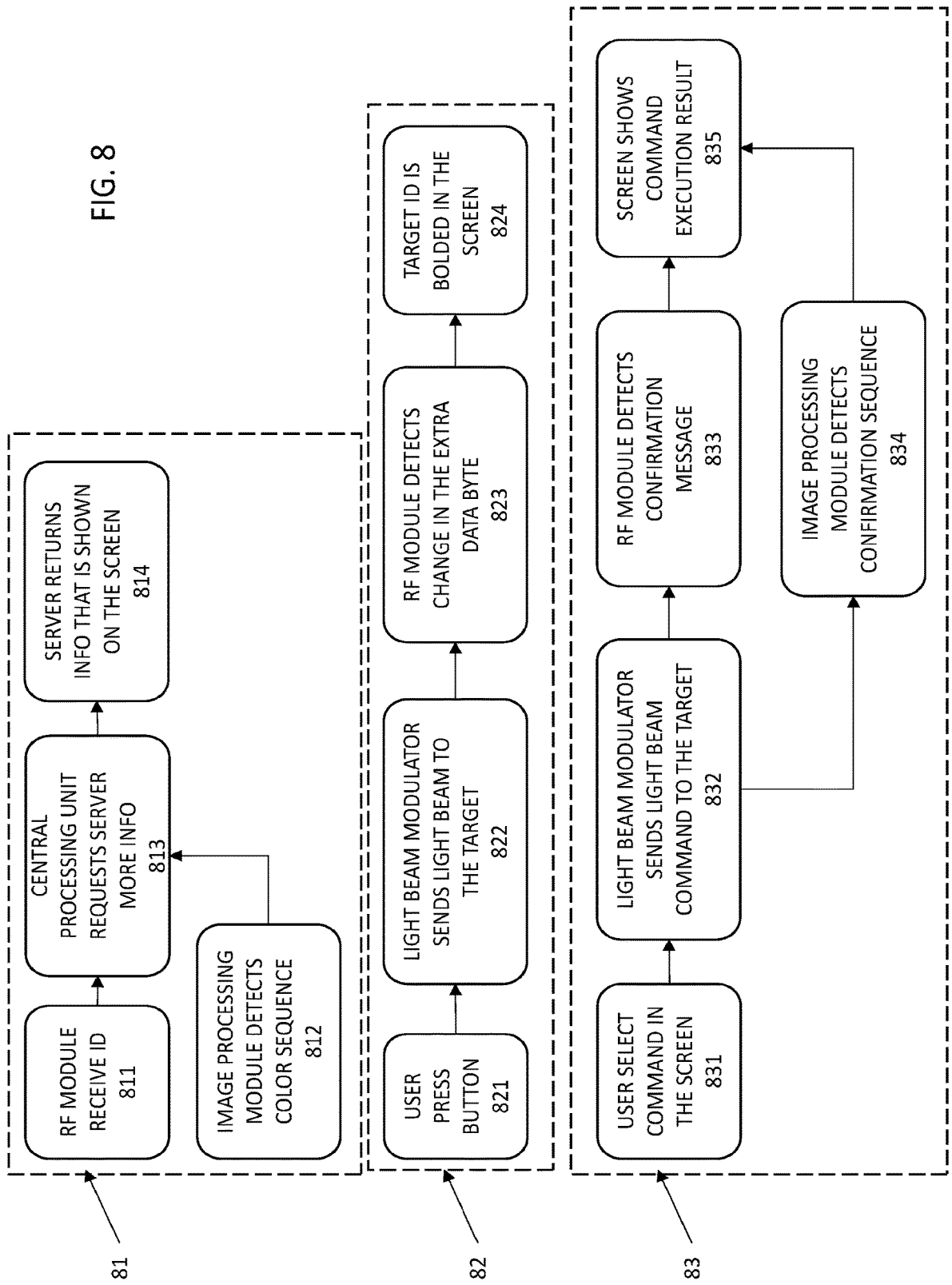
FIG. 8 shows the remote (e.g., ground) device software flow, according to the example implementation.

The ground identification device 21 has a camera with zoom 22 capable of capturing images such as video in real-time. The identification procedure flow 81 as shown in FIG. 8 is executed to process the video and identify the aircraft. This video goes to an image processing module 36, connected to camera 32 in FIG. 4, which analyses the image to detect that the identification box blinks and capture the blink sequence.

Figure 6:
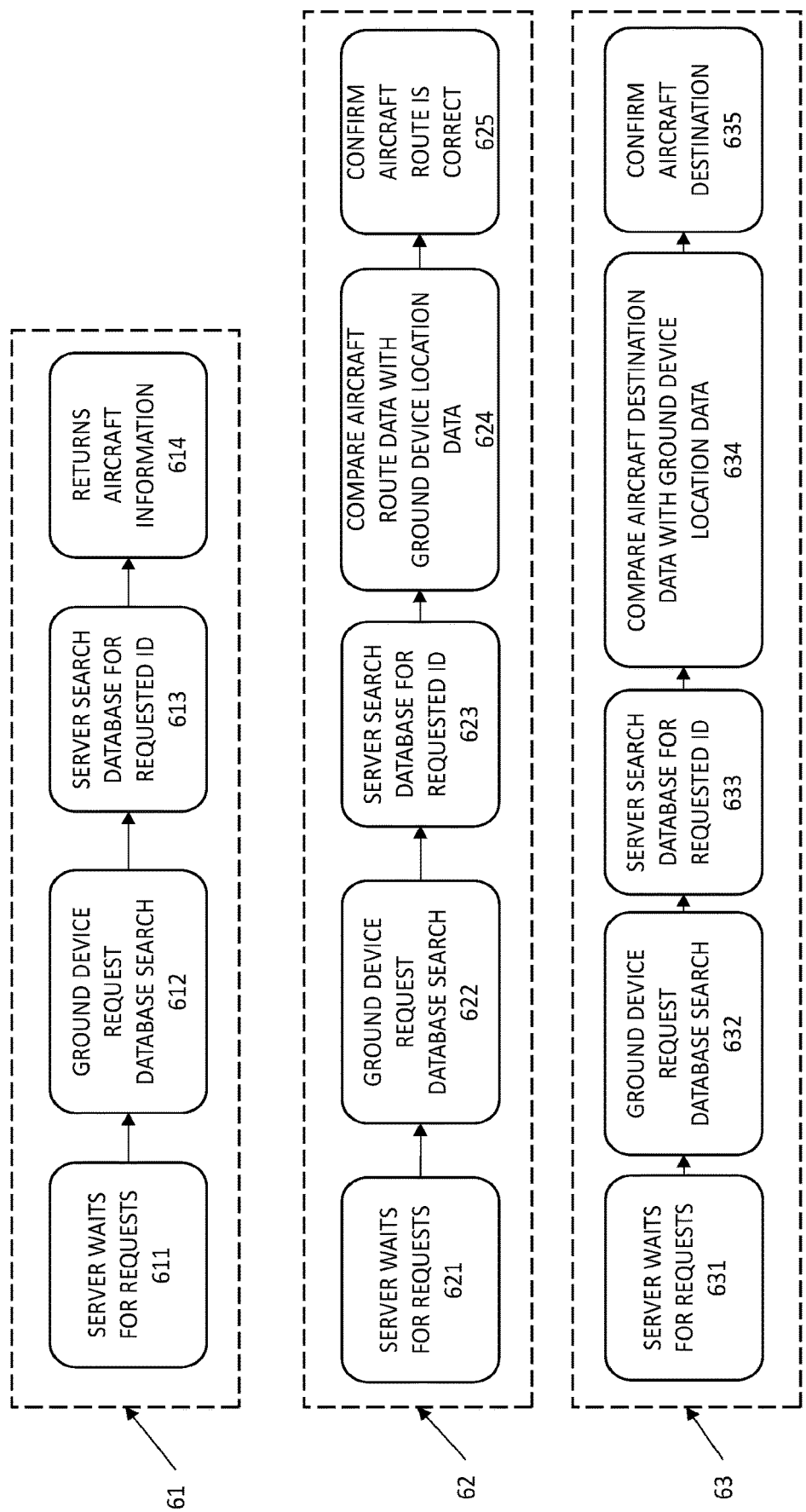
FIG. 6 shows the server process flow, according to the example implementation.

In case of a successful detection, the detected code is informed to the touchscreen 24, in the field 51 as shown in FIG. 5. A detection window 54 will be shown around the detected aircraft. A request to a server will be made to obtain further aircraft data, following the aircraft request data flow 61 as shown in FIG. 6. Other information, associated with the aircraft owner is presented in the field 52, is provided.

A location system antenna 27 (e.g., GPS antenna) is connected to a location module 41 as antenna 40 in FIG. 4, in order to get the position where the aircraft was detected. Both information, including the detected id and the location detection position, are transmitted to a server through a data communication antenna 28 connected to a data communication module 38 as antenna 34 in FIG. 4 (e.g. cellular network or Wi-Fi). The server will follow the aircraft route confirmation process 62 as shown in FIG. 6, and reply an id verification message that is presented in the field 53 of the touchscreen 24.

The ground identification device 21 also can detect aircrafts through the RF signal transmitted from the identification box RF module 16. The signal is received by the RF receiver antenna 26 connected to the RF receiver module 37, shown as antenna 33 in FIG. 4. Since many signals can be received at the substantially same time by the receiver module 37, the detected ids are presented in the field 55 in a list format. If at any time the user decides to use the touchscreen 24 to select (e.g., click) on any id number, a request will be made to a server following the aircraft information flow 61 of FIG. 6, to show more information about that aircraft.

In order to activate (e.g., excite) the identification box light sensor 19, the ground device has a light beam emitter 23 connected to a light beam modulator 35, shown as emitter 31 in FIG. 4. The light beam excitation flow 82 is executed by the ground device 21. This beam, when captured by the light sensor 19 will change the data transmitted by the identification box RF module 16. This difference in the data is detected by the ground device RF module 37, and the light excited aircraft id presented in the field 55 will be shown in a distinguishable form, for example but not by way of limitation, bold-text.

The ground device internal components are protected by a weather proof housing 29. The front screen panel has few general-purpose buttons 25 that can be configured, for instance, to perform commands provided by the user, such as to activate the light beam.

The identification box light emitters 3 and light sensor 4 of the identification box 1 create a two-way communication system. Similarly, the ground device camera 22 and light beam emitter 23 of the ground device 21 also create a two-way communication system. The RF receiver and transmitter 16 and 37 in both the identification box 1 and the ground device 21 creates a duplex communication. Therefore, the identification box 1 and ground device 21 together can exchange information through light or RF. This feature allows other applications. One example application may be to send data to an UAV through light and RF.

For instance, a delivery drone can receive a message to update its destination coordinate when the delivery drone gets closer to the delivery address as described following. The ground device 21 detects the UAV flying at a long distance from the user address through the RF signal received by the RF module 37. The ground device 21 communicate with the server sending the received ID and the device location capture by the location module 41 (e.g., GPS, AGPS, Wi-Fi mapping or cellphone tower position) to check if the received id belongs to a delivery UAV going to the ground device position.

The server follows the aircraft destination process flow 63 shown in FIG. 6 to return the confirmation to the ground device 21. When the server confirms if the UAV is going to the ground device position, the ground device 21 shows on its screen 24 a message informing the user that his delivery is arriving. The user points the ground device 21 to the UAV (e.g., goes outdoors), and uses one of the general-propose buttons 25 to turn on the light emitter 23.

At this moment, the ground device 21 will start to transmit its position through the RF module 37. The light sensor 4 of the identification box 1 detects the light beam and the RF module 16 receives the ground device 21 position. The identification box central control module 18 sends destination update to the UAV autopilot through the autopilot connector 10. After that, the UAV will update its destination to drop the delivery in the exact location the user is transmitting.

In addition, other applications can be provided if the ground device 21 is attached to an aircraft, and the identification box 1 is attached to a ground object. For instance, an automated landing procedure in a mobile landing pad attached to a vehicle can use these devices in this configuration. The identification device 1 is attached to several landing pads, each one sending a unique identification code through the light emitters 2 and the RF module 16 simultaneously.

The aircraft with the ground device 21 pointing to the ground receives the landing pad id and the location data through the RF module 37. A connection between the aircraft autopilot and the ground device 21 through the data connector 30 allows the ground device to send messages to the aircraft, a destination coordinates update for instance. After receiving the landing pad id, the ground device 21 search for the landing pad visual position of that specific landing pad color sequence using the camera 22.

This process allows a fine control of the aircraft using real-time optical navigation to approach and land in the moving landing pad. This application can be executed in an outdoor and indoor environment, even without the location data been transmitted by the landing pad identification box.

Further, the ground device 21 can modulate data through the light beam modulator 35. The identification box central control module 18 can demodulate the light beam in order to execute commands. The light beam command transmit flow 83 shown in FIG. 8 is executed by the ground device 21. The user selects the command on the screen 24, and the light beam modulator 35 turns the light beam emitter 23 on and off in a defined frequency and protocol. The identification box light sensor 4 detects the modulated light beam and send the binary data to the central control unit 18 that is execution the light beam command execution flow 73 shown in FIG. 7.

After the command execution, the identification box 1 sends the execution results (e.g. an ACK, or an error status code) to the ground identification unit 21 through the RF module 16 and it can also change the color sequence to show the result visually. For instance, the light controller module 17 can turn the red color on for a while in case of an invalid command, and the green light in case of a successfully executed command.

In FIG. 4 above, the central processing unit 39 receives inputs from the location module 41, the cellular modem 38, the RF module 37, the light beam modulator 35 and the image processing module 36, and performs the processes (e.g., software or instructions) associated with the ground identification unit 21.

FIG. 6 shows the server process flow, according to the example implementation. As explained above, and as shown in the flow 61, a server may await the receipt of a request at 611, such as from a ground device, for example. At 612, a ground device may request a database search, as explained above. At 613, the server receives the request from the ground device, and performs a search on the database, for the requested identity information, which was based on the combination of light signals, blanks etc. as explained above. At 614, upon obtaining the requested identification information of the aircraft, the requested information is returned to the ground device. Accordingly, the ground device may obtain identification information of the small and/or low altitude aircraft.

According to another example implementation of the server process flow, as shown in flow 62, at 621, the server waits for one or more requests from the ground device. At 622, the ground device provides a request for a database search. At 623, and as explained above, the server receives the request, and performs a search of the database for the requested identifying information of the aircraft. At 624, the server performs a comparison of the aircraft route data, with the ground device location data. In this operation, the server confirms whether the aircraft is on the correct route or not. At 625, the server provides a confirmation to the ground device as to whether or not the aircraft route is correct. At this point, a ground device or the server may optionally perform an action, such as providing a report of an incorrect aircraft route, or other report that one skilled in the art would understand to provide if an aircraft is not on a correct route.

According to yet another example implementation of the server process flow, as shown in flow 63, a server may await the receipt of a request at 631. As explained above, a ground device may provide a request for database search to the server at 632. At 633, and as explained above, upon receiving the request from the ground device for a server search, the server performs the search for the requested ID, and determines the identification of the aircraft. At 634, the server performs a comparison between the aircraft destination data, and the ground device location data. At this point, the server confirms whether the aircraft is at the correct destination or not. At 625, the server provides a confirmation to the ground device as to whether or not the aircraft is at the correct destination. At this point, and as explained above with respect to operation 625, the ground device or the server may optionally perform an action indicative of the correctness of the aircraft destination.

FIG. 7 shows the identification box software flow, according to the example implementation. For example, but not by way of limitation the flows 71, 72, 73 may be implemented on a processor that is present in the identification box as explained above. Alternatively, various operations may be offloaded to other processors in the identification box.

As shown in flow 71, and as explained above, at 711, the central control module reads instructions stored in a nonvolatile storage. Based on the reading of those instructions, at 712 the central control module instructs light emitters to light a color sequence instruction in a loop. The color sequence instruction may be determined based on the command received at the central control module. At 713, the RF module receives location data from a location module, and transmits a code and location information associated with the location data the RF module performs this operation in response to command the central control module. The central control module may provide this command based on the code or instructions stored in the nonvolatile storage. At 714, the light emitters are emitting the instructed color sequence, and the RF module has obtained the necessary location data and prepared the necessary information, and the identification box, including the light sensor and RF module, are waiting an external event, such as the heat of information from the ground device.

As shown in flow 72, and is also explained above, at 721, light sensor detects a light beam. For example, the light beam may be received from the ground device. At 722, the central control module receives the light beam information, and verifies the wavelength of the light beam. Based on the wavelength of light beam, it is determined whether the received light beam is a light beam associated with an instruction for that aircraft associated with the identification box that is attached to the aircraft. At 723, a behavior configuration is read from the nonvolatile storage by the central control module. At 724, the RF module changes in extra data field based on the information provided in operation 725. At 725, a light coat pattern is changed, based on the instruction also provided from central control module, based on the information received in operations 721, 722 and 723. Accordingly, an instruction is provided, either by the ground device, another aircraft or a flight control tower, or other source of instruction as would be understood by those skilled in the art, to instruct the identification box of the aircraft change the light code pattern. Light code pattern changed may be indicative of a certain status of the aircraft, such as being on the correct or incorrect destination, or other information.

As shown in flow 73, the light sensor of the identification box may detect the light beam at 731. At 732, the central control module may demodulate the light beam, thus determining any information instruction associated with light beam. At 733, the central control may execute a command based on the information and instructions received in the demodulated light beam. At 734, the RF module may send from the screen of the user interface of the ground device. At 735, the light code pattern may change based on the command execution result.

FIG. 8 shows the remote (e.g., ground) device software flow, according to the example implementation. As shown in flow 81, at 811, the RF module of the ground device may receive identification information, such as the identification should of the aircraft. At 812, imaging processing module may detect a color sequence associated with the aircraft that is admitted by the identification box. At 813, the central processing unit of the ground device may transmit a request to the server to obtain information associated with color sequence that was received. At this point, one or more of the operations described above in flow 61, 62 and/or 63 may be performed. At 814, the server returns the requested information to the ground device, and the requested information is shown on the screen, as explained above.

As shown in flow 82, at 821, a user may activate an object on a user interface, such as pressing a button on a screen of the ground device. At 822, a light beam modulator may transmit a light beam from the ground device to a target. For example, but not by way of limitation, the target may include the aircraft, and more specifically, the identification box of the aircraft. At the 23, the RF module may detect a change in the extra data might, as explained above. Further, at 824, the target ID may be bolded or otherwise identified in the user interface, so as to highlight to the user the change in that target ID associated with the aircraft.

As shown in flow 83, at 831, the user may select a command in the screen. At 832, a light beam modulator may send a light beam command to the target, such as the identification box of the aircraft as explained above. At 833, the RF module may detect a confirmation message received from the target, such as a message received from the identification box. Further, in response to the light beam, at 834, the image processing module may also detect a confirmation sequence, as shown above. At 835, the screen receives and shows a result of the command execution, as also explained above.

In the forgoing example implementation, there must be two-way trust between the server and the drone. For example, but not by way of limitation, the drone must be able to trust that the server that is transmitting policy information from a remote location such as at ground level is authentic, and is providing verified policy information. Conversely, the server and transmitters at the ground must have trust that the target drone that is receiving the policy information is credentialed. If two-way trust is not verified, the risk of transmission and reception is high.

The risks of misidentification or erroneous validation by either the drone, or the ground transmitter and server, or both are substantial. For example, but not by way of limitation, a drone that accepts an unverified policy command could be receiving that information, which may result in the drone performing unauthorized commands, or commands provided by bad actors. Similarly, if a transmitter from the ground is unable to verify that the drone is credentialed, the transmitter from the ground may be providing policy or command information to an un-trusted party, or a bad actor that may use this information to avoid detection, or perform bad acts.

Moreover, the forgoing example implementations permit credentialing of the drone, so as to provide grant privileges at two levels. At the group level, a drone may be identified as being associated with a trustworthy source (e.g., company, law enforcement, etc.). At an individual level, the drone may be verified as to his individual identification based on the information transmitted to the ground device, as explained in the forgoing example implementations.

In view of the relatively short distances between a small drone and the ground identification device, as well as the relatively short time that is available for the drone to implement the policy or commands provided by the ground identification device, an ad hoc authorization network connection is required to exchange information. This connection is essentially a peer to peer connection, as opposed to a connection provided via mobile telecommunications network or via website or general Internet communication. The network connection is specific to the drone associated with the identifying information, and the example implementation must be able to perform the connection and communication without connectivity to the Internet, as well as without needing to clear the communication via a database for security reasons. Given the short distance of peers from each other, communication is generally limited to direct communication by RF and light signals, as explained above. Further, in view of the nature of the motion of a drone, and the speeds of movements and pursuit, the communication must be real time, and delayed or asynchronous communication may result in the drone not being able to achieve its intended task, goal or purpose.

To implement the foregoing, each drone is provided with a certificate by a certificate authority, which may include the ground identification device. Depending on the carrier or protocol, the communication may be performed by RF, Wi-Fi, Bluetooth, or other communication protocol for which real-time peer-to-peer communication may be performed in a secure manner. For example, but not by way of limitation, in a Wi-Fi network, TCP/IP or HTTP/HTTPS as would be understood by those skilled in the art may be used to implement a security protocol. Similar schemes may be employed for Bluetooth communications, as explained in further detail below.

Disclosed herein are systems and processes to provide secured wireless communication utilizing SSIDs conforming to the 802.11 standard as the mechanism of network packet identification. The system implements a rotating SSID which is utilized to address information packets over wireless networks. By frequently changing the SSID, the probability of it being discovered and exploited or spoofed are greatly reduced.

In order for this system to be reliable, the transmission of the identification must be reliable and unique, but also predictable to known parties so that the identification can be can tracked on the server-side to ensure that the wireless beacon was not changed or cloned, etc. The system utilizes an OTP (one-time password) generation technique to periodically generate a token utilized for the SSID.

A pre-shared private key may be used to generate a hash, or a hash may be hard-coded into the device. Hashes may be generated utilizing a hash function which gives a number of the correct length, for example SHA 1 (Secure hash Algorithm), but not limited thereto; other schemes and encryption or hashing methods as would be understood by those skilled in the art at the time of the invention may be substituted therefore without departing from the inventive scope.

Because this hash is immutable, it must be combined with another variable make sure that the uniqueness of the generated token will be predictably different each time. The system utilizes a digital time stamp at a given moment as the second portion of the information used to generate the token for the SSID.

In applications where ephemeral (volatile) memory is used, non-permanent data is lost when the system is shut down or the battery voltage becomes too low. This may have the side effect of disrupting the timing as well. Because token generation for the SSID requires that the times be the same in order for SSIDs to match, it is important that time be maintained in the event of a system shutdown.

There are a number of ways which this can be achieved. First, it is possible to utilize GPS as a "point of truth" for time synchronization, although in this case the speed with which the SSID will be cycled may become inefficient. Another option is to place the device into a configuration mode every time it starts or charges. The most effective solution is to use a RTC (real time clock) circuit with a long backup battery. This implementation has the additional benefit of maintaining a more accurate clock by separating the time increments from the system's compute cycles as system voltage fluctuations can cause the clock speed of a system to shift which would cause the time signature used in the SSID to be incorrect.

Figure 9:
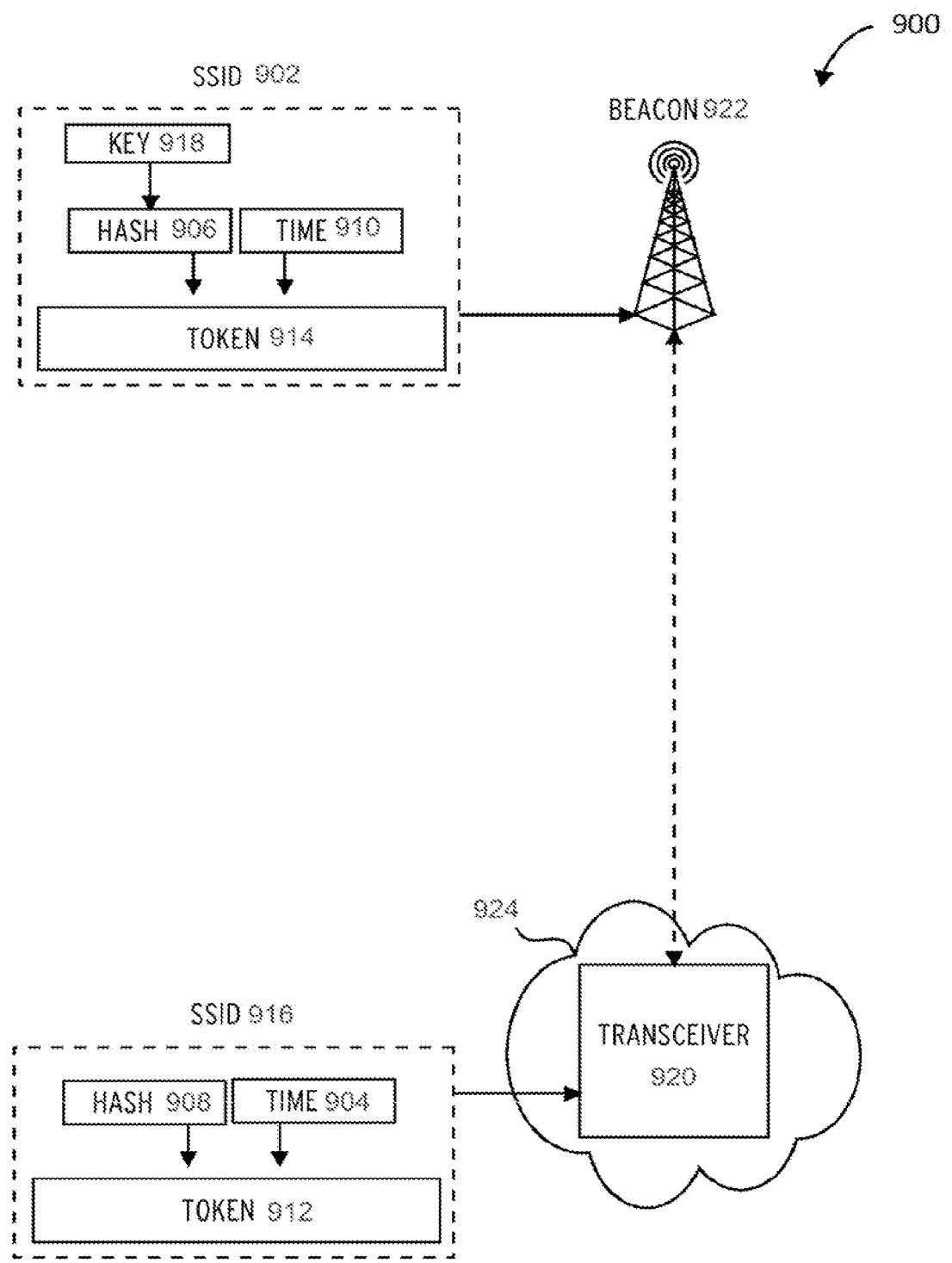
FIG. 9 illustrates an embodiment of an encryption system 900 for low altitude aircraft identification.

FIG. 9 illustrates an embodiment of an encryption system 900 for low altitude aircraft identification. The encryption system 900 may be operated in accordance with the process outlined in FIG. 10. The encryption system 900 comprises an SSID 902, a first time 904 (the output of a clock circuit, for example), a first hash 906, a second hash 908, a second time 910, a first token 912, a second token 914, an SSID 916, a key 918, a transceiver 920, and a beacon 922. A private, pre-shared key 918 may be used to generate the hash 906 which is then combined with the time 910 to create the token 914 which is used in the SSID 902.

In order to establish wireless communications over the network 924, the SSID 902 and the SSID 916 must match, which requires that the hash 908 is the same as the hash 906 and that the time 910 is the same as the time 904. This enables a secure, predictable rotating SSID which can be calculated on both network ends to allow for secure connection between a wireless beacon 922 and a transceiver 920 on the network 924.

Figure 10:
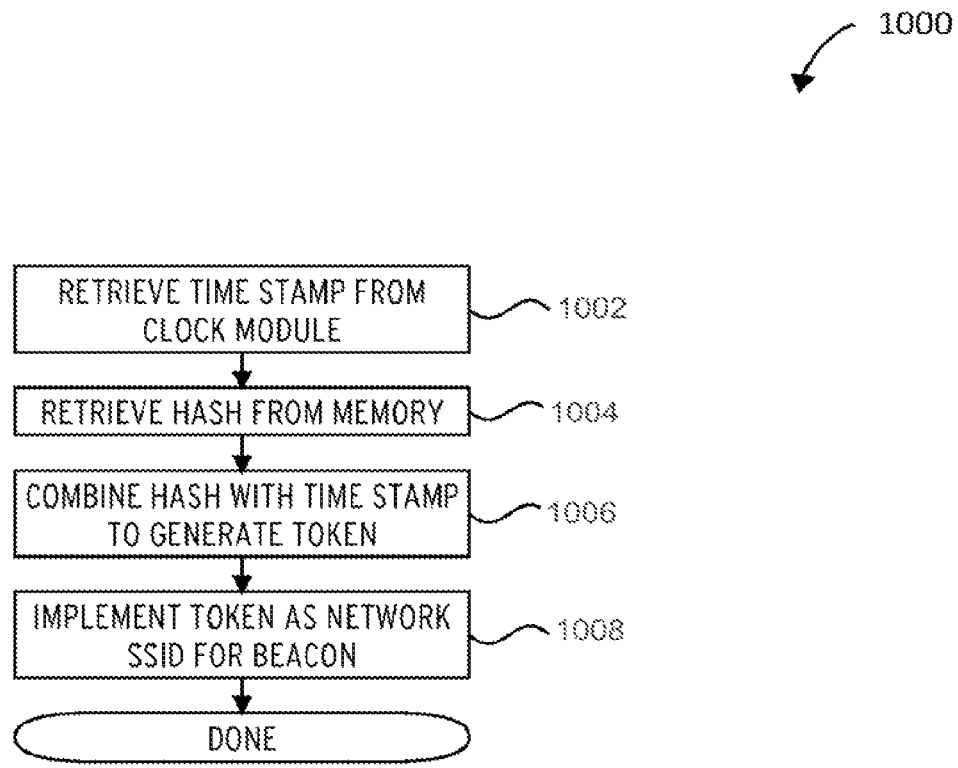
FIG. 10 illustrates an embodiment of an encryption process 1000 for low altitude aircraft identification systems.

FIG. 10 illustrates an embodiment of an encryption process 1000 for low altitude aircraft identification systems. In block 1002, encryption process 1000 retrieves a time stamp from a clock module. In block 1004, the encryption process 1000 retrieves a hash from memory. In block 1006, the encryption process 1000 combines the hash with the time stamp to generate a token. In block 1008, the encryption process 1000 implements the token as a network SSID for a beacon.

Figure 11:
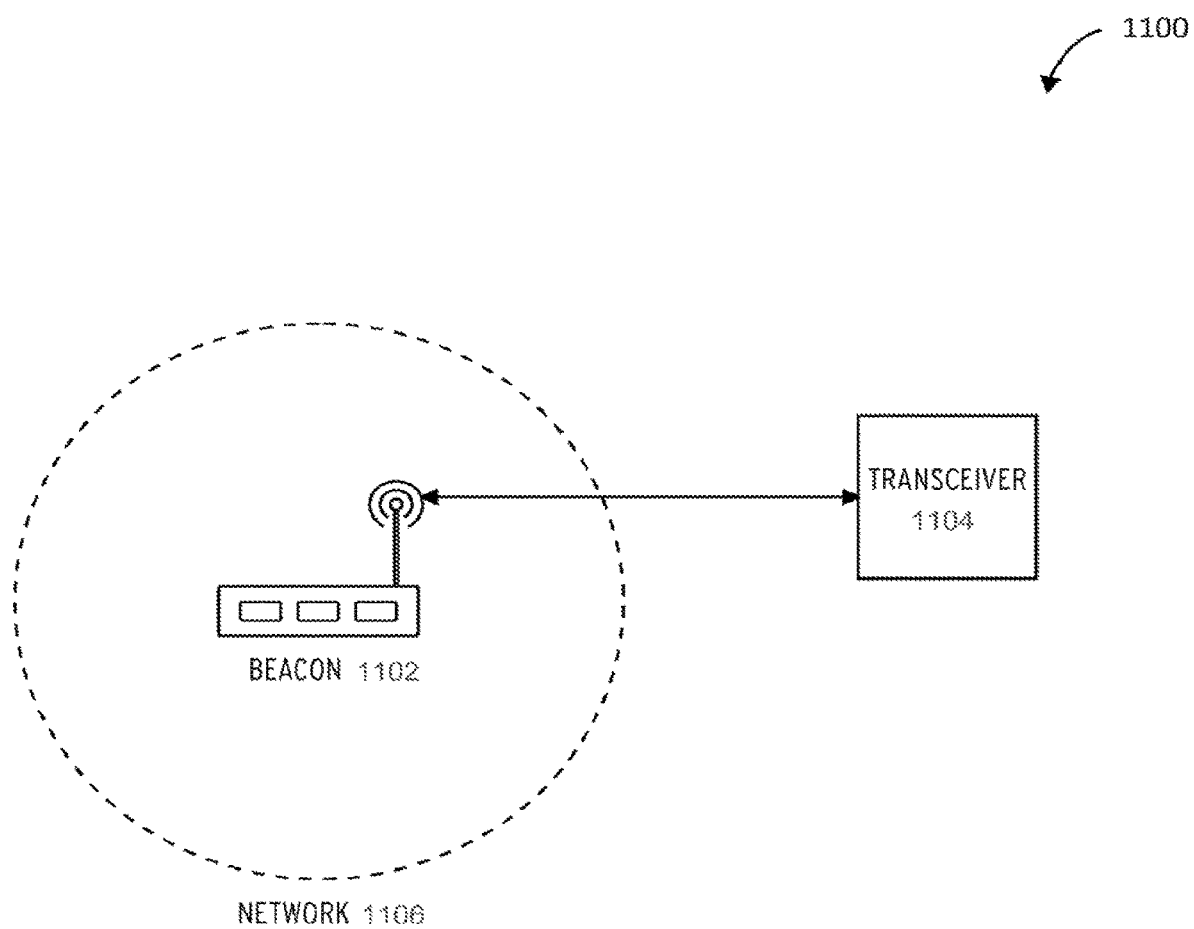
FIG. 11 illustrates an embodiment of an encryption system 1100 for low altitude aircraft identification.

FIG. 11 illustrates an embodiment of an encryption system 1100 for low altitude aircraft identification. The encryption system 1100 comprises a beacon 1102, a network 1106 and a transceiver 1104. Transceiver 1104 accesses the network 1106 via the beacon 1102 by utilizing the rotating SSID 916 generated by the encryption system 900.

Figure 12:
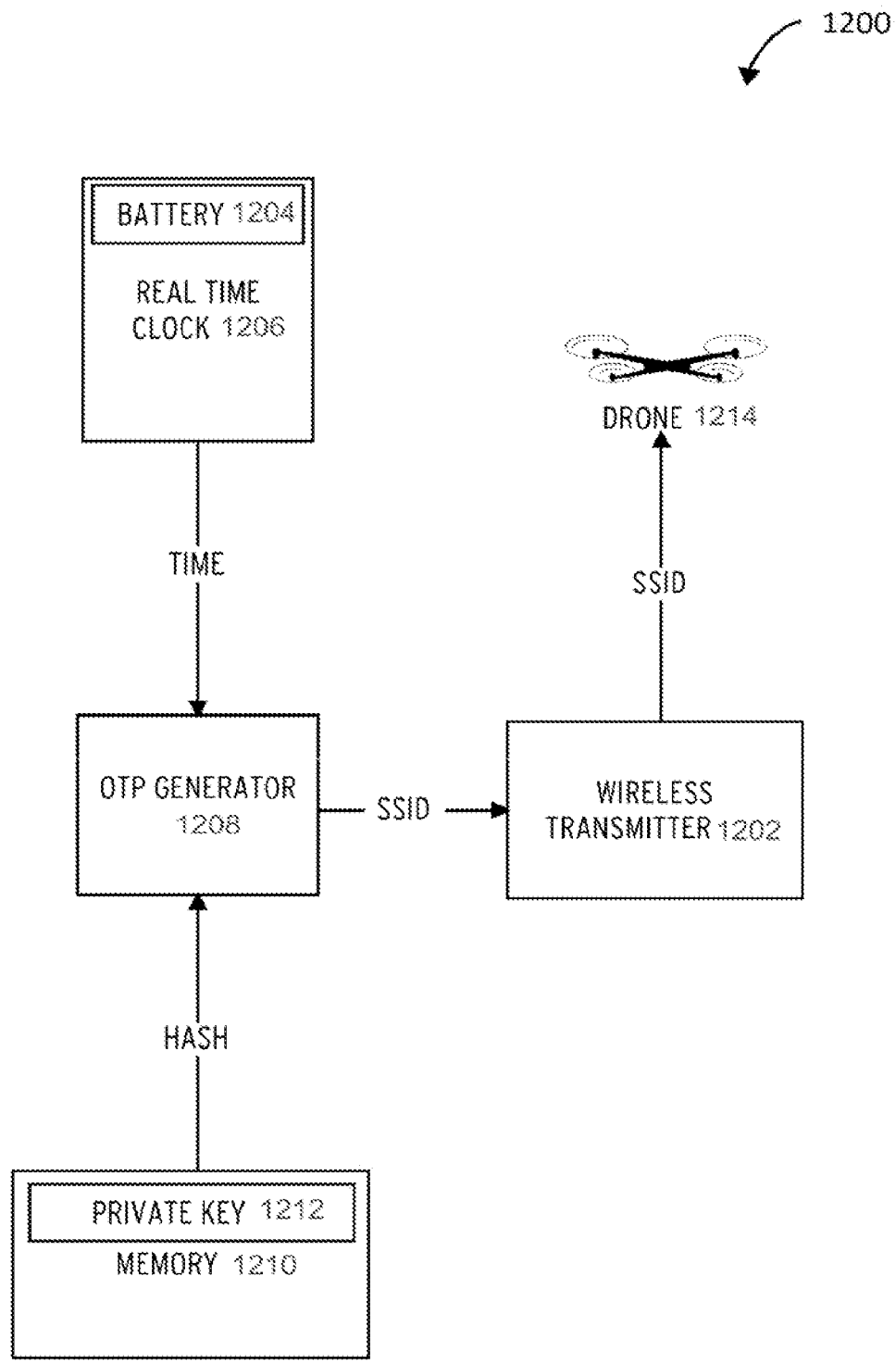
FIG. 12 illustrates an embodiment of an encryption system 1200 for low altitude aircraft identification.

FIG. 12 illustrates an embodiment of an encryption system 1200 for low altitude aircraft identification. The encryption system 1200 comprises a drone 1214, a wireless transmitter 1202, a battery 1204, a real time clock 1206, an OTP generator 1208, a memory 1210, and a private key 1212.

The private key 1212 in memory 1210 is applied to generate a hash which is then combined with a timestamp from a real time clock 1206 in the OTP generator 1208 to generate an SSID, which is utilized by the wireless transmitter 1202 and the drone 1214 to communicate with one another.

Figure 13:
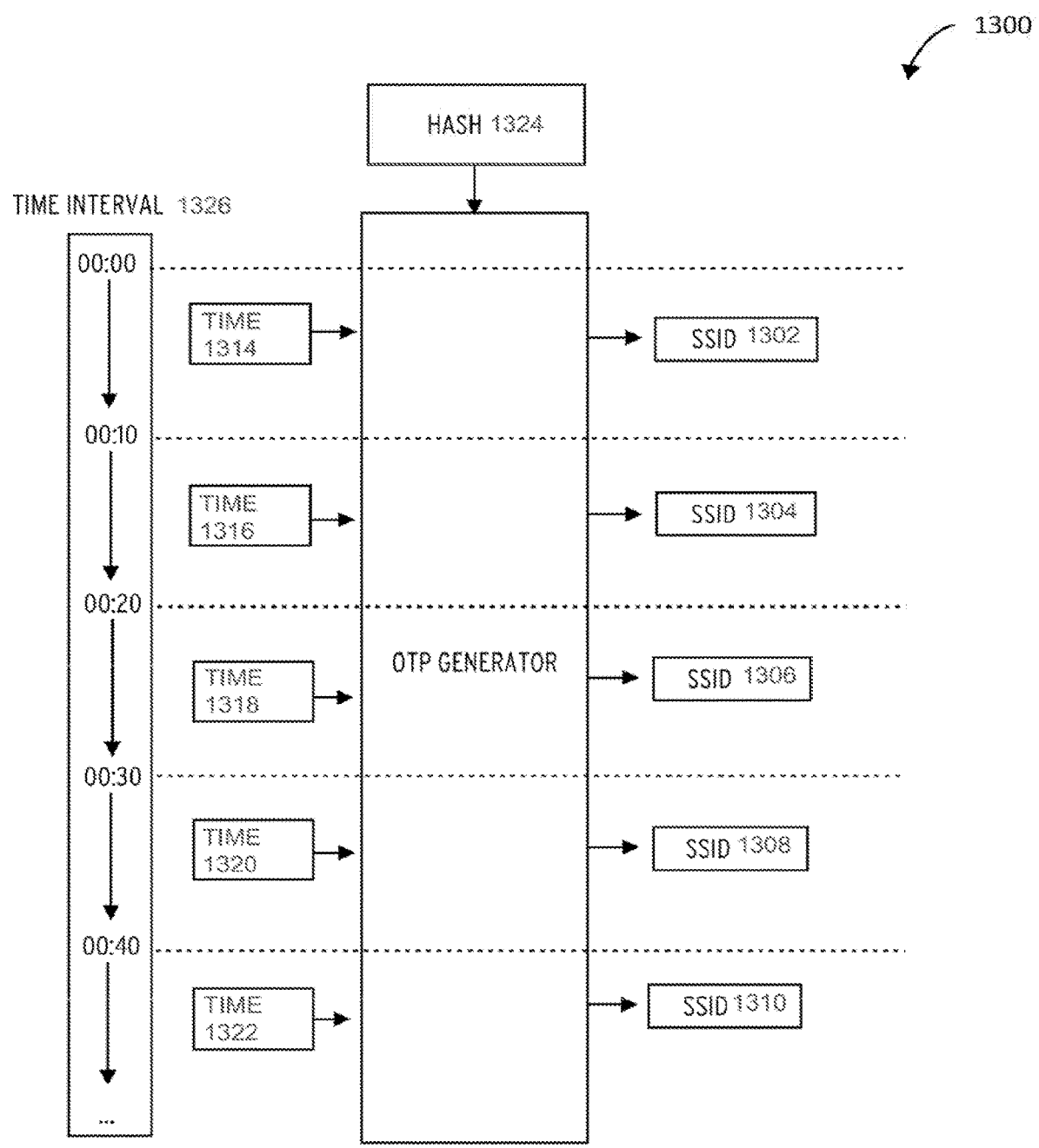
FIG. 13 illustrates an embodiment of encrypted communication 1300 in low altitude aircraft identification systems.

FIG. 13 illustrates an embodiment of encrypted communication 1300 in low altitude aircraft identification systems. The encrypted communication 1300 comprises various SSIDs (SSID 102, SSID 1304, SSID 1306, SSID 1308, and SSID 1310) generated at different times (time 1314, time 1316, time 1318, time 1320, and time 1322) by an OTP generator 1208 based on an applied a hash 1324.

The OTP generator 1208 combines the hash 1324 and with time 1314 to create SSID 1302. The OTP generator 1208 waits a time interval 1326 and then combines time 1316 with the hash 1324 to generate SSID 1304. The OTP generator 1208 waits again for the time interval 1326 and combines time 1318 with hash 1324 to generate SSID 1306, and so on to generate SSID 1308 and SSID 1310, etc.

The time interval 1326 may be fixed or may vary by an amount or by a function that is pre-shared between the wireless beacon and the device that will communicate with the wireless beacon, e.g., a low altitude aircraft such as a drone.

Figure 14:
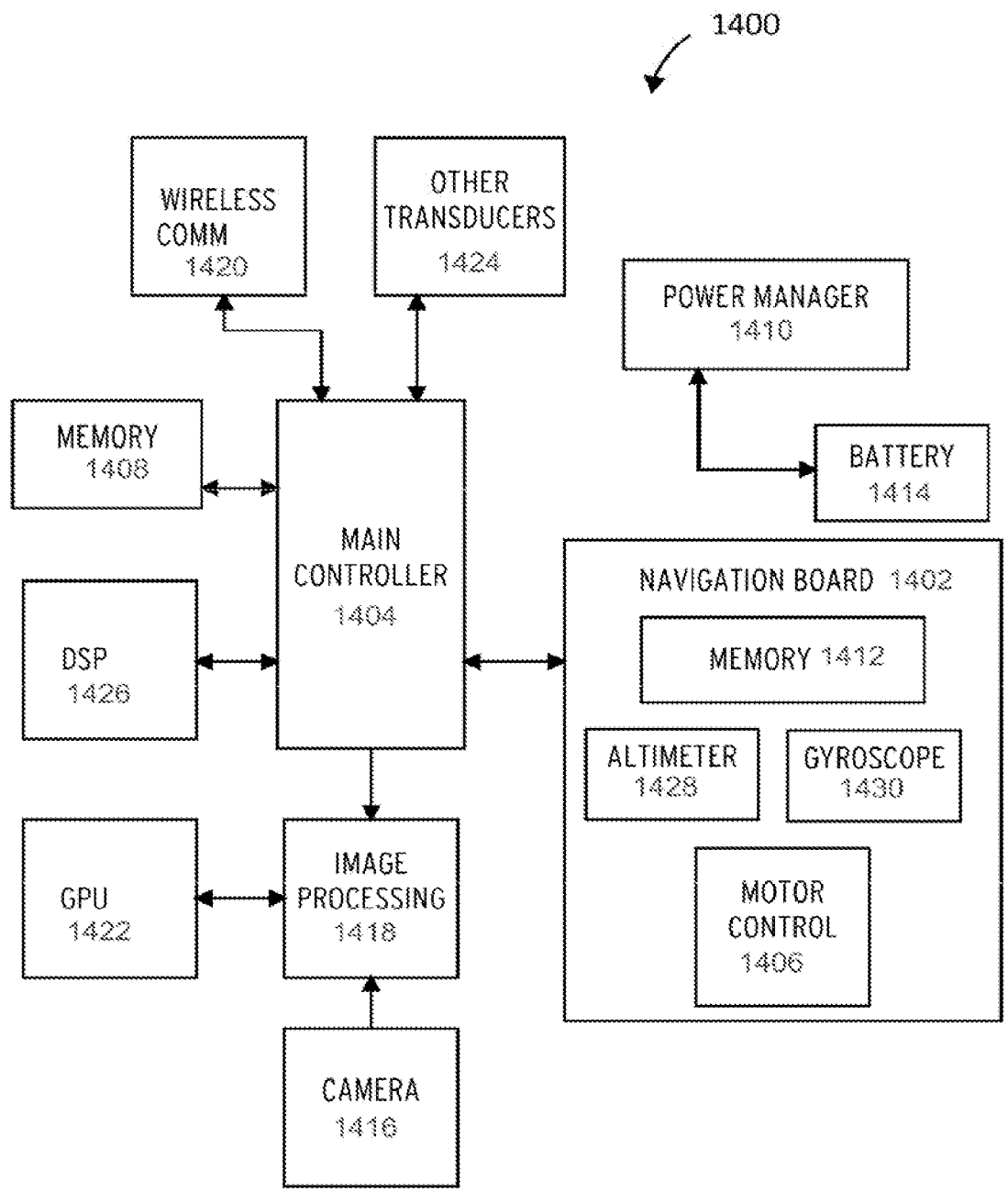
FIG. 14 illustrates an embodiment of drone operation logic 1400.

Referring to FIG. 14, drone operation logic 1400 comprises a main controller 1404 the controls and coordinates the operation of other components as well as providing general computational capabilities (e.g., to execute image processing 1418). The main controller 1404 may comprise a central processing unit and/or one or more controllers or combinations of these components.

The drone operation logic 1400 will typically comprise memory 1408 which may be utilized by the main controller 1404 and other components (e.g., the DSP 1426 and or the GPU 1422) to read and write instructions (commands) and data (operands for the instructions).

At least one camera 1416 may interface to image processing 1418 logic to record images and video from the environment. The image processing 1418 may operate to provide image/video enhancement, compression, feature extraction, and other transformations, and provide these to the main controller 1404 for further processing and storage to memory 1408. The image processing 1418 may further utilize a navigation board 1402 and or DSP 1426 toward these ends. Images and video stored in the memory 1408 may also be read and processed by the main controller 1404, DSP 1426, and/or the GPU 1422.

The drone operation logic 1400 may operate on power received from a battery 1414. The battery 1414 capability, charging, and energy supply may be managed by a power manager 1410.

The drone operation logic 1400 may transmit wireless signals of various types and range (e.g., cellular, WiFi, BlueTooth, and near field communication i.e. NFC) using the wireless communication logic 1420 and/or other transducers 1424. The drone operation logic 1400 may also receive these types of wireless signals. Wireless signals are transmitted and received using one or more antenna. Other forms of electromagnetic radiation may be used to interact with proximate devices, such as infrared (not illustrated).

The drone operation logic 1400 may include a navigation board 1402 which includes a motor control 1406 (to operate propellers and/or landing gear), an altimeter 1428, a gyroscope 1430, and its own memory 1412.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Improvements on Related Art

The related art aircraft identification systems focus on civil or military aviation. None of the related art systems work for a small aircraft in a low altitude. Using a visible light sequence, an aircraft in a low altitude flight may be visually identified.

The other related art identification systems for aircraft need a radar system or special devices to be able to receive the identification signal, which works well for a scenario involving an airport tower and an aircraft, but does not work for a scenario involving a person without such devices and an aircraft.

Using visible light identification, a person can observe at an aircraft and memorize its color sequence. This approach is similar to the way cars are identifiable by their license plate, instead of the way aircrafts are identified in the related art.

Other Uses or Applications for This Invention

This invention is an identification system that can be used to identify any vehicle, ship, aircraft or other static or mobile objects that are located up to about 1 mile from a person.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

| REFERENCE NUMERALS IN THE DRAWINGS | |
|---|---|
| 1 - Identification box | 2 - Light arrays |
| 3 - Light emitters | 4 - Light sensor |
| 5 - RF antenna | 6 - Location system antenna |
| 7 - Memory card slot | 8 - Power connector |
| 9 - Housing | 10 - Autopilot data connector |
| 11 - Light emitter | 12 - RF antenna |
| 13 - Location system antenna | 14 - Location module |
| 15 - Non-volatile storage module | 16 - RF module |
| 17 - Light controller module | 18 - Central control module |
| 19 - Light receiver | 20 - Internal power storage |
| 21 - Ground identification device | 22 - Camera with zoom |
| 23 - Light beam emitter | 24 - Touchscreen |
| 25 - General buttons | 26 - RF antenna |
| 27 - Location system antenna | 28 - Data communication antenna |
| 29 - Housing | 30 - Data connector |
| 31 - Light beam emitter | 32 - Camera module |
| 33 - RF antenna | 34 - Data communication antenna |
| 35 - Light beam modulator | 36 - Image processing module |
| 37 - RF module | 38 - Data communication module |
| 39 - Central processing unit | 40 - Location system antenna |
| 41 - Location module | |
| 51 - Id captured by the camera | 52 - Aircraft responsible name |
| 53 - System message | 54 - Detection window |
| 55 - RF detected ids | 56 - General buttons |
| 61 - Aircraft data request flow | 62 - Aircraft route confirmation process |
| 63 - Aircraft destination confirmation process | |
| 71 - Main loop flow | 72 - Light beam detection flow |
| 73 - Light beam command execution flow | |
| 81 - Identification procedure flow | 82 - Light beam excitation flow |
| 83 - Light beam command transmit flow | |

The invention claimed is:

1. A device configured to communicate identification information associated with a low-altitude aircraft, the device comprising:
one or more light arrays each including color light emitters that generate a defined color sequence in response to an instruction received from a light controller configured to control the color light emitters, wherein the one or more light arrays are coupled to the low-altitude aircraft;
a radio frequency communication antenna coupled to a radio communication module that transmits information associated with the low-altitude aircraft through a transmitted radio signal, wherein the radio communication module is configured to receive a received radio signal and store the information in a storage, wherein the radio frequency communication antenna is coupled to the low-altitude aircraft and the radio communication module is configured to utilize a secure identifier, and the radio communication module is configured for two-way communication; and
a location module configured to store positioning data; wherein the device is coupled to the low-altitude aircraft.

2. The device of claim 1, further comprising an external power connector configured to recharge an internal power storage and supply power to all internal and external components.

3. The device of claim 1, further comprising a housing that protects the device against impact and weather, wherein a light detection sensor is coupled to the low-altitude aircraft, and the secure identifier comprises a rotating Service Set Identifier (SSID) associated with headers of packets sent over a wireless local-area network.

4. The device of claim 1, wherein the color sequence identifies an identification (ID) code using a visible light sequence.

5. The device of claim 1, wherein the color sequence comprises a sequence of different colors in a loop.

6. The device of claim 1, wherein the color sequence comprises one or more colors with different blink times.

7. The device of claim 1, wherein the light emitters comprises one or more of LEDs,
OLEDs, quantum dots, light bulbs and laser beams, and the color sequence includes infrared light.

8. The device of claim 1, further comprising an external light detection sensor.

9. The device of claim 1, wherein the information is transmitted together with the identification information of the low-altitude aircraft, and the information is transmitted by the communication module via at least one of cellular, Wi-Fi, Zigbee, near field communication (NFC), or Bluetooth connection.

10. The device of claim 1, further comprising a location receiver.

11. The device of claim 1, further comprising a GPS receiver.

12. The device of claim 1, further comprising a cellular network modem.

13. The device of claim 1, further comprising a wireless data link.

14. The device of claim 1, further comprising a defined light beam emitter.

15. The device of claim 1, further comprising a light beam sensor.

16. A system configured to communicate with a low-altitude aircraft, the device being remote from the low-altitude aircraft, the system comprising:
an image capture component configured to receive one or more images associated with a plurality of colors of light emitted from the low-altitude aircraft as detected by the image capture component;
an image processing module coupled to image capture component and configured to analyze the one or more images to identify the low-altitude aircraft;
a user interface configured to receive a command from a user and provide information associated with the low-altitude aircraft, wherein the information associated with the low-flying aircraft is at least in part obtained from a server;
a location module configured to determine a position of the low-altitude aircraft, including by identifying a detected ID; and the data communication module configured to utilize a secure identifier, and is configured for two-way communication with the low-altitude aircraft.

17. The system of claim 16, wherein the user interface is configured to simultaneously
provide information associated with a plurality of different low-altitude aircrafts.

18. The system of claim 16, further comprising a light beam emitter configured to provide information to the low-altitude aircraft.

19. The system of claim 16, wherein the data communication module transmits the data using at least one of cellular, Wi-Fi, Zigbee, near field communication (NFC), or Bluetooth connection.

20. The system of claim 16, wherein the low-altitude aircraft detects a defined light beam generated by the system.

21. A device configured to communicate identification information associated with a low-altitude aircraft, the device comprising: a radio frequency communication antenna; and a radio communication module coupled to the radio frequency communication antenna and configured to transmit identification information associated with the low-altitude aircraft through a transmitted radio signal, wherein the radio communication module is configured to receive a received radio signal and store the information in a storage, wherein the radio frequency communication antenna is coupled to the low-altitude aircraft and the radio communication module is configured to utilize a secure identifier, and the radio communication module is configured for two-way communication with a remote portable detection system; and wherein the device is coupled to the low-altitude aircraft and the remote portable detection system includes a user interface configured to provide to a user, information associated with a plurality of different low-altitude aircrafts detected by the remote portable detection system.

\* \* \* \* \*